Dec. 17, 1940.  H. C. DANIELS  2,225,333
COMPOSITE FLEXIBLE CABLE FOR HIGH-TENSION ELECTRICAL TRANSMISSION
Filed May 18, 1939   2 Sheets-Sheet 2
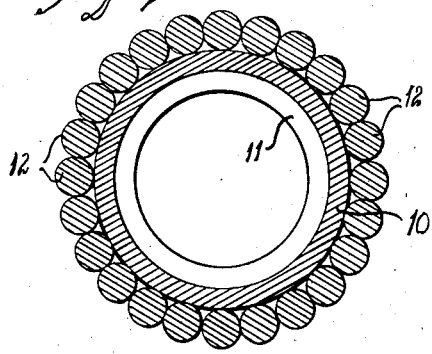
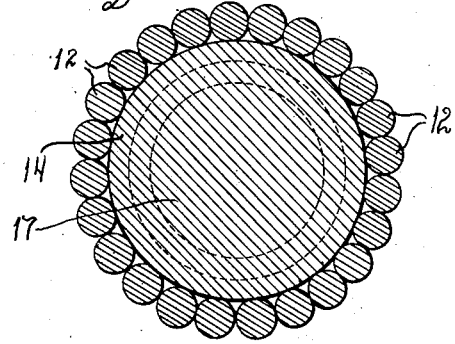
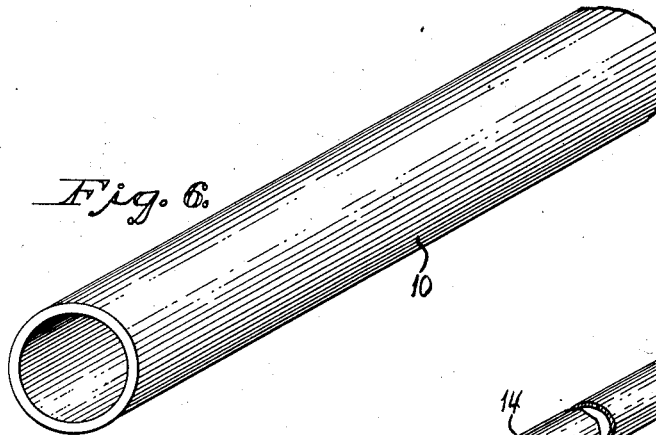
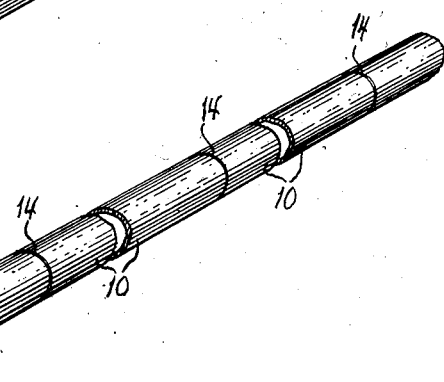
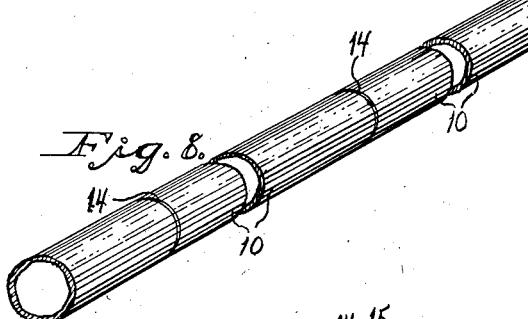
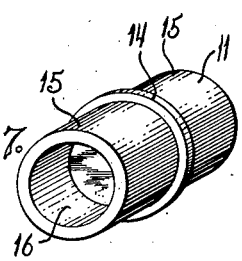
Inventor
Harold C. Daniels
By Seymour Earle Nichols
Attorneys Patented Dec. 17, 1940

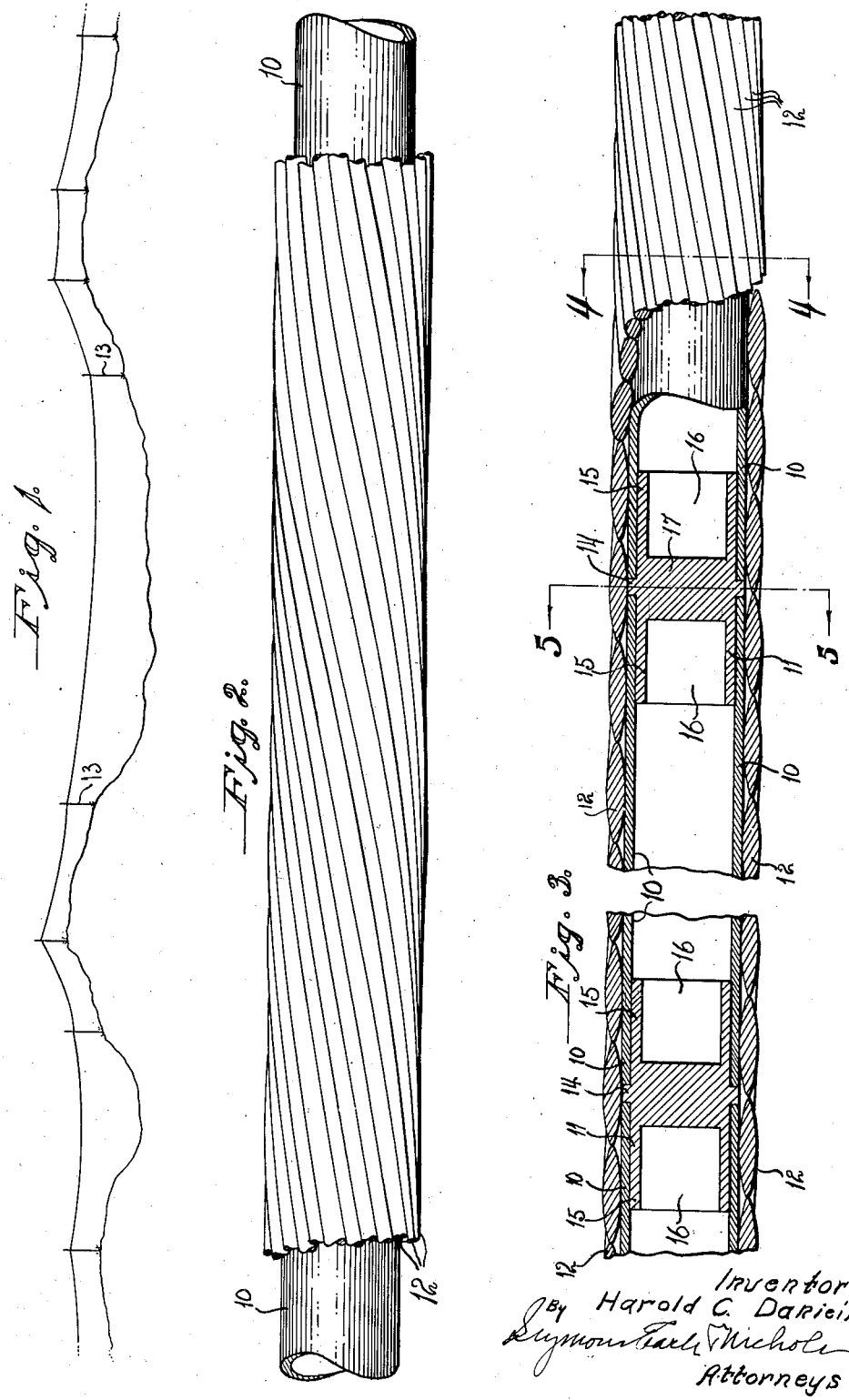

2,225,333

UNITED STATES PATENT OFFICE 2,225,333

COMPOSITE FLEXIBLE CABLE FOR HIGH-TENSION ELECTRICAL TRANSMISSION

Harold C. Daniels, Woodbury, Conn., assignor to Chase Brass & Copper Co. Incorporated, Waterbury, Conn., a corporation Application May 18, 1939, Serial No. 274,341

7 Claims. (Cl. 174—131)

The present invention relates to improvements in electrical conductors, and more particularly to improvements in composite cables for high-tension electrical transmission-lines.

Many types of composite cables have heretofore been devised for high-tension electrical transmission lines, but all of the same have been open to one or more serious objections such, for instance, as permitting the entry of water into their interiors thus not only adding damaging weight but also courting rupture due to freezing, excessive vibration tendencies which not only tend to crystallize the conductor itself but also seriously damage the supporting structure, high initial cost as well as high maintenance cost, etc., etc.

One of the objects of the present invention is to provide a superior composite flexible cable for high-tension electrical transmission-lines characterized by low cost for manufacture and maintenance.

Another object of the present invention is to provide a novel composite flexible cable for high-tension electrical transmission-lines, having superior resistance to damage by the freezing of moisture.

A further object is to provide a superior composite flexible cable for high-tension electrical transmission-lines, characterized by superior resistance to penetration by moisture.

Still another object of the present invention is to provide a superior composite flexible cable for high-tension electrical transmission-lines and characterized by minimum vibration tendencies to thus guard against the crystallization of the cable itself as well as to guard against damage to insulators or other supporting structures.

A still further object of the present invention is to provide a superior cable of the character described, and combining certain of the advantages above indicated together with inherent capacity for minimizing corona effects.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic view illustrating an overhead-suspension high-tension electrical transmission-line embodying the present invention as shown in connection with supporting poles and the adjacent earth contours;

Fig. 2 is a broken view in side elevation of a fragment of flexible composite high-tension cable embodying the present invention;

Fig. 3 is a broken view mainly in central-longitudinal section and partly in side elevation of the cable;

Fig. 4 is a transverse sectional view taken on the line 4—4 of Fig. 3;

Fig. 5 is a similar view taken on the line 5—5 of Fig. 3;

Fig. 6 is a perspective view of a fragment of one of the body-tubes of the cable;

Fig. 7 is a perspective view of one of the body-tube-connectors; and

Fig. 8 is a broken perspective view of a series of body-tubes shown as connected together end to end preparatory to the application thereto of the conducting-strands.

The flexible composite high-tension cable shown in the accompanying drawings comprises a series of body-tubes arranged end to end and each designated by the reference character 10. The said body-tubes 10 are coupled together in the relationship referred to by means of body-tube-connectors 11 which will be more fully hereinafter described. Extending helically around the body-tubes 10 and the body-tube-connectors 11, is a plurality of conducting-strands 12. The said conducting-strands 12 are preferably so proportioned as to laterally abut against each other and to snugly fit against the outer peripheries of the various body-tubes 10 and the exposed portions of the body-tube-connectors.

The body-tubes 10, body-tube-connectors 11 and the conducting-strands 12 are formed of copper, or other suitable high-conductive material, having sufficient tensile strength to withstand the strains incident to their being installed on relatively-widely-separated supports such, for instance, as the poles 13 schematically illustrated in Fig. 1.

Each body-tube-connector 11 is provided with a centrally-located annular and radially-projecting locating-flange 14 which is adapted to be abutted on its respective opposite sides by the respective ends of the particular two body-tubes which the connector serves to unite. Extending axially in opposite directions respectively, away from the central locating-flange 14 just referred to are two oppositely-projecting tenons 15—15 which are cylindrically-contoured on their outer peripheries to respectively snugly fit within the adjacent one of the body-tubes 10 as is shown particularly well in Fig. 3. Each of the tenons 15—15 is formed with a lightening-recess 16 which is separated from the similar recess of the companion tenon by means of an integral relatively-thick partition 17 located laterally in line with the locating-flange 14 before referred to.

The fit between the outer periphery of each of the tenons 15—15 and the interior periphery of the mating body-tube 10, is preferably such as to form a snug sliding fit. After a given pair of body-tubes 10 are fitted over a given one of the body-tube-connectors 11 and after the surfaces have been properly cleaned and coated with a suitable flux, the assembly is preferably heated by means of a blow-torch or the like, and a suitable solder is then introduced at each of the opposite sides of the central locating-flange 14 to flow by capillary action into the minute capillary spaces between the outer peripheries of the tenons 15—15 and the respective inner periphery of the body-tubes 10 sleeved thereover. Upon being allowed to cool, the sweat-soldering referred to will firmly unite the body-tubes 10 and the body-tube-connector 11 with a strength equal to or in some instances exceeding the tensile strength of the annealed body-tubes 10.

By way of example a composite flexible cable embodying the present invention may have a continuous length, for instance, of five thousand feet in which the helically-arranged conducting strands 12 would be continuous and the core or supporting structure might consist of fifty body-tubes 10, or their equivalent, each having a length of one hunded feet and with the adjacent ends of each given pair of body-tubes firmly united by one of the body-tube-connectors 11.

The resulting structure created by assembling the elements in the manner above described and as shown in the accompanying drawings, creates a composite cable which is flexible and in which the conducting strands 12, or their equivalent, are firmly supported interiorly in such manner as to virtually preclude the collapse of the structure under excessive tensile stresses. Furthermore, the body-tubes 10 (which are preferably seamless drawn copper-tubes suitably annealed) guard against the access of water into the hollow interior of the cable structure, thus not only avoiding the possible breakage of the cable due to the excess weight of water but also guard against the possibility of the rupture of the structure due to the freezing of the water.

Despite the advantages above referred to, the cable of the present invention may be produced at a relatively low cost of manufacture considering its high efficiency as an electrical conductor. In this connection attention may be called to the fact that the body-tubes 10 and the body-tube-connectors 11 provide a most direct path for current lengthwise of the cable.

Contrary to what might be expected, it has been found that the employment of circumferentially continuous body-tubes, such as the body-tubes 10, in conjunction with the conducting-strands 12 or their equivalent, produces a structure which has less tendency to damaging vibration than cables employing body-structures of helical ribbons or strands or otherwise having a peripherally-discontinuous character.

Furthermore, the interposition of body-tube-connectors in the body or core of the cable, serves to further dampen objectionable vibrations.

It may be explained in this connection that the vibrating of a high-tension transmission-cable not only tends to crystallize and weaken the cable structure itself but also tends to break or otherwise damage the supporting structure such for instance, as the insulators and their carriers.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A composite overhead-suspension high-tension electrical-transmission cable, including in combination: an inner conductor formed of a series of watertight metal body-tubes each having a circumferentially-continuous wall and joined together in end-to-end, watertight relationship; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

2. A composite overhead-suspension high-tension electrical-transmission cable, including in combination: an inner tubular-metal watertight conductor having a circumferentially-continuous wall and provided at spaced intervals throughout its length with longitudinally-spaced-apart watertight partitions sealing off successive portions of the interior of said inner conductor from each other; and an outer conductor formed of a plurality of metal strands surrounding and extending substantially lengthwise of the said inner conductor uninterruptedly over the partitions therein, the outside diameter of said cable being substantially uniform throughout.

3. A composite overhead-suspension high-tension electrical-transmission cable, including in combination: an inner conductor formed of a series of watertight metal body-tubes each having a circumferentially-continuous wall and joined together in end-to-end, watertight relationship and provided at spaced intervals throughout its length with longitudinally-spaced-apart watertight partitions sealing off successive portions of the interior of said inner conductor from each other; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

4. A composite overhead-suspension high-tension electrical-transmission cable, including in combination: an inner conductor formed of a series of watertight metal body-tubes each having a circumferentially-continuous wall and arranged in end-to-end relationship; a body-tube connector fitting within each two adjacent body-tubes and joining them together; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

5. A composite overhead-suspension high-tension electrical-transmission cable, including in combination: an inner conductor formed of a series of watertight metal body-tubes each having a circumferentially-continuous wall and arranged in end-to-end relationship; a body-tube connector fitting within each two adjacent body-tubes and joining them together, and each said connector having a watertight partition sealing off from one another, the interiors of the body-tubes the connector connects together; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

6. A composite overhead-suspension high-tension electrical-transmission cable, including in combination: an inner conductor formed of a series of watertight metal body-tubes each having a circumferentially-continuous wall and arranged in end-to-end relationship; a body-tube connector fitting within each two adjacent body-tubes and having a locating-flange intermediate its ends and between each two adjacent body-tubes and joining them together; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

7. A composite overhead-suspension high-tension electrical-transmission cable, including in combination: an inner conductor formed of a series of watertight seamless metal body-tubes each having a circumferentially-continuous wall and arranged in end-to-end relationship; a body-tube connector fitting within and soldered to each two adjacent body-tubes and joining them together, and each said connector having a watertight partition sealing off from one another, the interiors of the body-tubes the connector joins together; and an outer conductor formed of a plurality of metal strands surrounding and extending substantially lengthwise of the said series of body-tubes uninterruptedly over the joints therebetween, the outside diameter of said cable being substantially uniform throughout the said tubes and joints.

HAROLD C. DANIELS.